May 16, 1967 J. M. CARAHER 3,319,423
WATER-COOLED, SELF-REGULATING, EXHAUST NOZZLE
FOR A SUBMARINE THERMAL POWER PLANT
Filed May 24, 1966
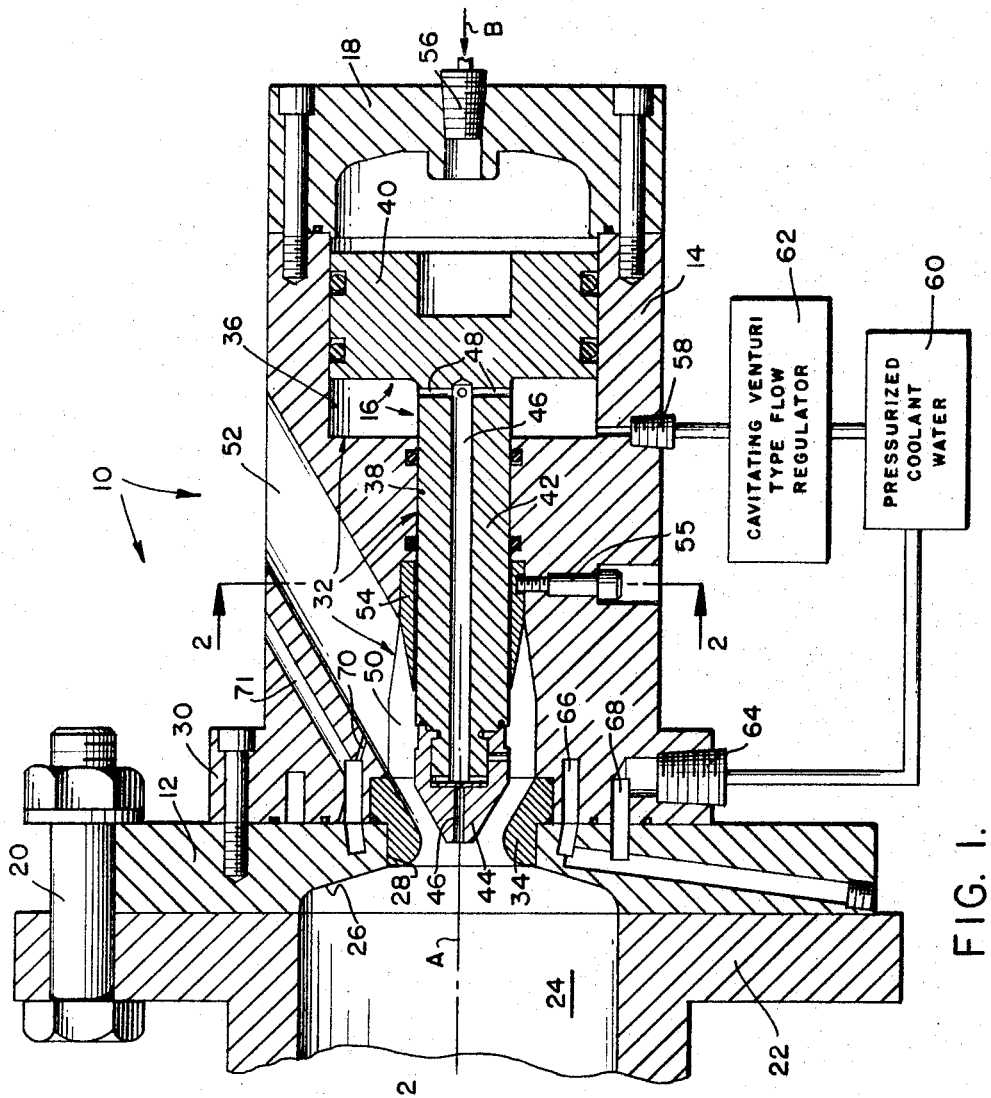
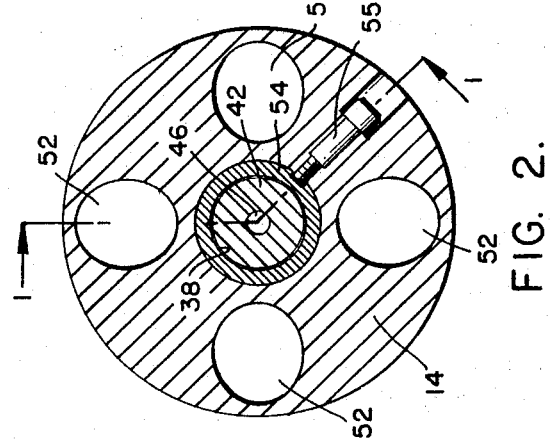
*INVENTOR.*
JAMES M. CARAHER
BY
MICHAEL F. OGLO
ROY MILLER
ATTORNEYS.

3,319,423
WATER-COOLED, SELF-REGULATING, EXHAUST NOZZLE FOR A SUBMARINE THERMAL POWER PLANT
James M. Caraher, Glendale, Calif., assignor to the United States of America as represented by the Secretary of the Navy
Filed May 24, 1966, Ser. No. 552,643
7 Claims. (Cl. 60—242)

The invention described herein may be manufactured and used by or for the Government of the United States of America for governmental purposes without the payment of any royalties thereon or therefor.

This invention relates to thermal power plants for submerged operation in small submarines, and more particularly, to a combustion gas exhaust nozzle having special utility in exhausting combustion gases overboard from the submarine to the ambient environment.

Examples of thermal power plant equipment with which the present invention has such special utility are disclosed in U.S. Patent 3,145,508 to H. E. Karig, and in the copending application of C. A. Reisman et al., Ser. No. 538,183, filed Mar. 24, 1966, now Patent No. 3,276,205, entitled, "Combustion Chamber and Injector Unit for a Combination of Liquid and Gaseous Propellants."

An object of the invention is to provide a hydraulically adjustable, self-regulating, combustion gas exhaust nozzle which is selectively adjustable to maintain the internal pressure of the hot gas side of a thermal power plant above the back pressure produced by the ambient water over the submarine's range of operating depths.

Another object is to provide an exhaust nozzle in accordance with the previous objective, and which further provides self regulation irrespective of independent variations in flow rate of combustion gases and therefore is of special utility in connection with combustion gas producing systems having independent throttling control.

Another objective is to provide an exhaust nozzle in accordance with the first objective, which has a water coolant feature of special utility in conjunction with chemical propellant types of combustion gas producing systems, which intrinsically have extremely high temperatures of combustion gases.

Other objects and many of the attendant advantages of this invention will be readily appreciated as the same becomes better understood by reference to the following detailed description when considered in connection with the accompanying drawings wherein:

FIG. 1 is a central section of a thermal power plant exhaust nozzle for combustion gases in accordance with the present invention, taken along lines 1—1 of FIG. 2.

FIG. 2 is a transverse section of the exhaust nozzle taken along lines 2—2 of FIG. 1.

Referring now to the drawing, the subject of the invention is a water-cooled, pressure regulating, exhaust valve 10. This valve has special utility in connection with a closed cycle steam power plant of the type disclosed in U.S. Patent 3,145,508 to H. E. Karig, referred to earlier, which is intended for use in small, deep operating submarines. In the latter operational environment it is desired to maintain the internal pressure of the hot gas side of the thermal power plant above the back pressure produced by the ambient water at all depths of submergence. A feature of valve 10 is that it is hydraulically controllable to adjust the combustion gas pressure on the hot gas side of the thermal power plant, as will become apparent from the ensuing description.

In structure, valve 10 broadly comprises a flange and combustion gas face member 12, a valve body 14, a pintle and piston element 16, and a piston chamber dome 18. Flange and combustion gas face member 12 is provided with a ring of bolts 20 (only one is shown) about its periphery for use in bolting same to a matching circular flange 22. Flange 22 is affixed to the cool end of the hot gas passages 24 of the boiler or steam generator. A dished recess 26 is formed on the front face of member 12 with a central opening 28 about axis A extending therethrough. The front end of valve body 14 is provided with a flange portion 30 and is attached to the rear face of member 12 by means of flange bolts. Valve body 14 has central cavity compositely designated 32, coaxially aligned about axis A, and when valve body 14 and member 12 are in their assembled condition a De Laval nozzle insert ring 34 is rigidly retained between member 12 and a shoulder formed in cavity 32. The convergent gas entry side of the nozzle ring 34 faces the front, and the downstream or divergent side of the nozzle faces the rear. Member 12 may be made of a conventional heat resistant "303" stainless steel, and nozzle ring 34 is preferably made of a somewhat more heat resistant material such as Inconel X.

At the rear end of valve body 14, the central cavity 32 is enlarged to form a piston chamber 36, and the section immediately forward of the chamber forms a slide bore 38 for the pintle and piston element 16. The pintle and piston element 16 comprises a rear piston portion 40 which slidingly engages the piston chamber walls, a shank portion 42 extending forwardly therefrom and in sliding engagement with bore 38, and a pintle tip member 44 affixed to the end of the shank. Tip member 44 is made of a highly heat resistant material such as tantalum T–111, and is frusto-conically shaped with the included angle of the frustocone approximately matched to the angle of divergency of the discharge side of the nozzle insert ring 34. In the normal range of operating positions of pintle and piston element 16, the frustocone projects into the divergent side of the nozzle ring 34 and there provides an obstruction to the discharge of gases through same. An axial coolant and pressure transmission passage 46 extends from the frontal surface of the frustoconical tip to a point just ahead of pisotn 40, where equiangular radial passages 48 communicate between the axial passage and the lateral surface of shank portion 42. The portion of central cavity 32 adjoining the rear edge of nozzle ring 34 forms an exhaust manifold cavity section 50 somewhat larger in diameter than the shank 42 of element 16. Four equiangularly spaced outlet passages 52 extend obliquely in rearward and lateral directions, communicating the manifold section with the exterior of the valve body. A copper sleeve 54 is affixed adjacent the forward end of slide bore 38 by a set screw 55, and projects forwardly into manifold section 50. The outside diameter of sleeve 54 decreases in the forward direction and the sleeve wall thickness tapers to a knife edge at its front end. Piston chamber dome 18 is bolted to the rear end of valve body 14, forming the end wall to piston chamber 36.

A selectively variable hydraulic control pressure signal, diagrammatically represented by arrow B, is introduced into piston chamber 36 through port 56 where it will act against the rear face of the piston. Coolant water, at a constant flow rate regardless of back pressure, is introduced into piston chamber 36 ahead of piston 40 through a port 58. To provide such a constant flow rate, the output from a pressure source of coolant water 60 is applied to port 58 via a conventional cavitating venturi-type flow regulator 62. Coolant water, at a constant flow rate, is also introduced to a port 64, which in turn communicates with annular cooling channels 66 and 68 concentrically disposed about the De Laval type nozzle. A small part of the water coolant flow through channel 66 is introduced into outlet passages 52 to cool the exhaust gases via a small feeder passage 70. The major portion of the coolant is drained through an outlet 71.

In operation, the desired pressure of combustion gas in the steam generator unit is fed to the back side of piston 40. The pressure at the tip of pintle nose member 44 is communicated back to the forward section of piston chamber 36, while the coolant water flows forwardly through passages 48 and 46, and thence into the combustion gas zone. Since the coolant flows through passage 46 at a constant flow rate, the pressure differential thereacross is constant, so that the front face of piston portion 40 senses the pressure at the tip of the pintle, plus the constant pressure differential. As the pressure is increased on the back of the piston, the pintle tip is forced further into the opening of the divergent gas exit side of nozzle insert 34, causing a decrease in the available flow area and an increase in the chamber pressure. When the pressures are balanced on both sides of the piston no further motion takes place. When the flow rate of the gases in thermal plant passage 24 is varied by actuating the combustion chamber controls (not shown, the pintle automatically adjusts its position due to temporary imbalance that occurs with this change. The flow of water out through pintle tip 44 enables operation with very hot gases without errosion or freezing of the parts. In this connection it has been found that the copper sleeve 54 is effective in protecting the sliding surface between bore 28 and piston and pintle 16.

Obviously many modifications and variations of the present invention are possible in the light of the above teachings. It is therefore to be understood that within the scope of the appended claims the invention may be practiced otherwise than as specifically described.

What is claimed is:
1. For use in connection with a combustion gas system of a thermal power plant, a water cooled, pressure regulating exhaust valve, comprising:
   (a) an elongated valve body adapted to be fitted in an exhaust port opening of a wall for containing the hot gases, said valve body having a front combustion face and having a central axial cavity extending inwardly from the combustion face,
   (b) the wall of the central cavity at its front end forming a De Laval-type nozzle having a convergent gas entry end adjoining the combustion chamber and a divergent gas exit end adjoining and extending rearwardly from the entry end,
   (c) the wall of the central cavity at its rear end forming an enlarged cylindrical piston chamber,
   (d) a piston and pintle element disposed in said central cavity having a two-faced piston element in slidingly engaged relationship to the wall of the piston chamber, and a central shank extending forwardly from the front face of the piston element and in sealing and sliding engagement with the wall of the central cavity intermediate to the De Laval-type nozzle and the piston chamber, said piston element dividing the piston chamber into front and rear piston compartments,
   (e) a lateral exhaust outlet adjoining the rear end of the De Laval-type nozzle for communicating the gases from gas exit end of the De Laval-type nozzle of the lateral exterior surface of the valve body,
   (f) the front end of the pintle and piston member forming a pintle nose to partially obstruct the gas exit end of the De Laval-type nozzle, under axial movement in the forward direction, said pintle nose decreasing the exhaust passage area through the lateral outlet passage,
   (g) said pintle and piston member having a coolant water and combustion chamber pressure transmission passage communicating between the tip of the front end of the pintle nose and the front compartment of the piston chamber.
   (h) means for applying a reference pressure to the rear compartment, and
   (i) means for providing a constant flow rate of coolant water to the front compartment of the piston chamber for flow through the pressure transmission passage to cool the zone of the pintle nose and De Laval-type nozzle.
2. Apparatus in accordance with claim 1, said lateral exhaust outlet comprising,
   (j) an exhaust manifold section of the central axial cavity disposed adjoining the rear end of the De Laval-type nozzle and having a diameter greater than that of the shank of the piston and pintle element, and
   (k) a plurality of equiangularly spaced radial outlet passages extending between the exhaust manifold section and the exterior lateral surface of the valve body.
3. Apparatus in accordance with claim 1,
   (l) said radial outlet passages being inclined obliquely to the axis of the central cavity at the angle of divergency of the gas exit end of the De Laval-type nozzle so that the wall of each outlet passage in part forms an extension of the divergent wall of the nozzle.
4. Apparatus in accordance with claim 3, and
   (m) a copper sleeve for surrounding the piston shank affixed to the valve body and projecting forwardly into the exhaust manifold section of the central axial cavity.
5. Apparatus in accordance with claim 1, wherein;
   (n) said means for providing a constant flow rate of coolant water comprises a cavitating venturi type flow regulator.
6. Apparatus in accordance with claim 1,
   (o) said pintle nose having a frustoconical shape, with the coolant water and combustion chamber pressure transmission passage opening into the central frontal surface of the frustocone, the frustoconical surface having an included angle approximately matching that of the wall of the divergent gas exit end of the De Laval-type nozzle.
7. Apparatus in accordance with claim 1,
   (p) said coolant water and combustion chamber pressure transmission passage comprising a central cylindrical bore extending through the shank of the pintle and piston member to a blind end of the passage adjacent the front face of the piston element, and equiangularly spaced radial passages communicating said blind end of the passage with the exterior surface of the shank.

References Cited by the Examiner

UNITED STATES PATENTS

| | | | |
|---|---|---|---|
| 2,489,953 | 11/1949 | Burney | 60—242 X |
| 2,552,497 | 5/1951 | Roach et al. | 60—242 |
| 2,566,961 | 9/1951 | Poole | 60—242 |

CARLTON R. CROYLE, *Primary Examiner.*